(12) United States Patent
Taenaka

(10) Patent No.: US 9,266,556 B2
(45) Date of Patent: Feb. 23, 2016

(54) RACK GUIDE UNIT AND STEERING SYSTEM INCLUDING THE RACK GUIDE UNIT

(71) Applicant: JTEKT CORPORATION, Osaka-shi, Osaka (JP)

(72) Inventor: Makoto Taenaka, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/273,919

(22) Filed: May 9, 2014

(65) Prior Publication Data

US 2014/0338485 A1    Nov. 20, 2014

(51) Int. Cl.
   *B62D 3/12*       (2006.01)
   *F16H 55/28*      (2006.01)
   *F16H 19/04*      (2006.01)

(52) U.S. Cl.
   CPC .............. *B62D 3/126* (2013.01); *B62D 3/123* (2013.01); *F16H 19/04* (2013.01); *F16H 55/283* (2013.01); *Y10T 74/1967* (2015.01)

(58) Field of Classification Search
   CPC ........................... B62D 3/123; Y10T 74/1967
   See application file for complete search history.

(56) References Cited

U.S. PATENT DOCUMENTS

| | | | | |
|---|---|---|---|---|
| 3,433,501 | A * | 3/1969 | Hertel | 280/93.515 |
| 7,487,984 | B1 | 2/2009 | Lemont, Jr. et al. | |
| 2008/0034911 | A1* | 2/2008 | Bieber et al. | 74/422 |
| 2009/0223314 | A1* | 9/2009 | Eickholt | 74/422 |
| 2010/0122595 | A1 | 5/2010 | Sung et al. | |
| 2012/0318085 | A1 | 12/2012 | Park | |
| 2013/0036845 | A1* | 2/2013 | Amada et al. | 74/30 |
| 2013/0091979 | A1* | 4/2013 | Bareis et al. | 74/568 R |
| 2014/0020492 | A1* | 1/2014 | Fujita et al. | 74/422 |
| 2014/0251035 | A1* | 9/2014 | Ricker | 74/30 |
| 2014/0260719 | A1* | 9/2014 | Bae et al. | 74/30 |
| 2014/0338486 | A1* | 11/2014 | Taenaka et al. | 74/422 |
| 2015/0020619 | A1* | 1/2015 | Son et al. | 74/30 |

FOREIGN PATENT DOCUMENTS

| | | |
|---|---|---|
| EP | 1 184 255 A2 | 3/2002 |
| GB | 976661 | 12/1964 |
| JP | H09-39805 A | 2/1997 |
| JP | A-11-43055 | 2/1999 |

OTHER PUBLICATIONS

Extended European Search Report issued in European Patent Application No. 14168090.0 on Sep. 18, 2014.
Nov. 30, 2015 Office Action issued in European Patent Application No. 14168090.0-1755.

* cited by examiner

*Primary Examiner* — Ruth Ilan
(74) *Attorney, Agent, or Firm* — Oliff PLC

(57) ABSTRACT

A rack guide unit includes a closure member secured to an external opening end of an accommodation portion of a housing, and a rack guide. A compression coil spring and a coned disc spring that urge the rack guide toward a rack shaft are interposed between the closure member and the rack guide. A holding member that holds the coned disc spring includes a guide tube that guides a radially inner portion of the coned disc spring and a seat plate that receives a load from the coned disc spring. An elastic member held in an accommodation groove formed in the outer periphery of the guide tube is frictionally engaged with the inner periphery (opposed portion) of a tubular portion of the rack guide.

13 Claims, 11 Drawing Sheets

RACK GUIDE UNIT AND STEERING SYSTEM INCLUDING THE RACK GUIDE UNIT

INCORPORATION BY REFERENCE

The disclosure of Japanese Patent Application No. 2013-104204 filed on May 16, 2013 including the specification, drawings and abstract is incorporated herein by reference in its entirety.

BACKGROUND OF THE INVENTION

1. Field of the Invention

The invention relates to a rack guide unit and a steering system including the rack guide unit.

2. Description of Related Art

Generally, a rack-and-pinion-type steering system is provided with a rack guide unit that reduces a backlash between a rack and a pinion. In the rack guide unit, when a rack guide by which a rack shaft is slidably supported wears out, a compression coil spring interposed between the rack guide and a plug pushes the rack guide toward the rack shaft to compensate for a clearance between the rack guide and the plug.

According to Japanese Patent Application Publication No. 11-43055 (JP 11-43055 A), a coned disc spring is interposed between a rack guide and a plug so as to be installed in series with a compression coil spring. The coned disc spring is deformed to absorb an impact only when an excessively high impact load is input into the coned disc spring.

In FIG. 4 in JP 11-43055 A, the coned disc spring and an intervening member are accommodated and held in a tubular portion formed in the plug. In JP 11-43055 A, the intervening member is referred to as "second rack support". The intervening member is interposed between the compression coil spring and the coned disc spring. Specifically, the intervening member is held by a snap ring that is fitted in both a circumferential groove formed in the inner periphery of the tubular portion that guides the outer periphery of the coned disc spring and a circumferential groove formed in the outer periphery of the intervening member, and the coned disc spring is held between the intervening member and the bottom of tubular portion.

According to the technique described in JP 11-43055 A, in order to hold the coned disc spring and the intervening member in the plug, a cumbersome work for fitting the snap ring in both the circumferential groove of the plug and the circumferential groove of the intervening member is required. Thus, the total number of man-hours needed to obtain a subassembly of a rack guide unit including the plug is increased. This affects the efficiency of assembly of the rack guide unit.

SUMMARY OF THE INVENTION

One object of the invention is to provide a rack guide unit that is assembled with ease as a whole, and to provide a steering system including the rack guide unit.

A rack guide unit according to an aspect of the invention includes: a rack guide accommodated in an accommodation portion formed in a housing through which a rack shaft meshed with a pinion shaft is passed, so as to be allowed to approach and move away from the rack shaft, the rack guide supporting the rack shaft such that the rack shaft is slidable in an axial direction of the rack shaft; a closure member secured to an external opening end of the accommodation portion, the external opening end being located on an opposite side of the accommodation portion from the rack shaft; at least one coned disc spring that is interposed between the closure member and the rack guide, and that urges the rack guide toward the rack shaft; and a holding member that holds the coned disc spring, and that is frictionally engaged with and held by the rack guide directly or indirectly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
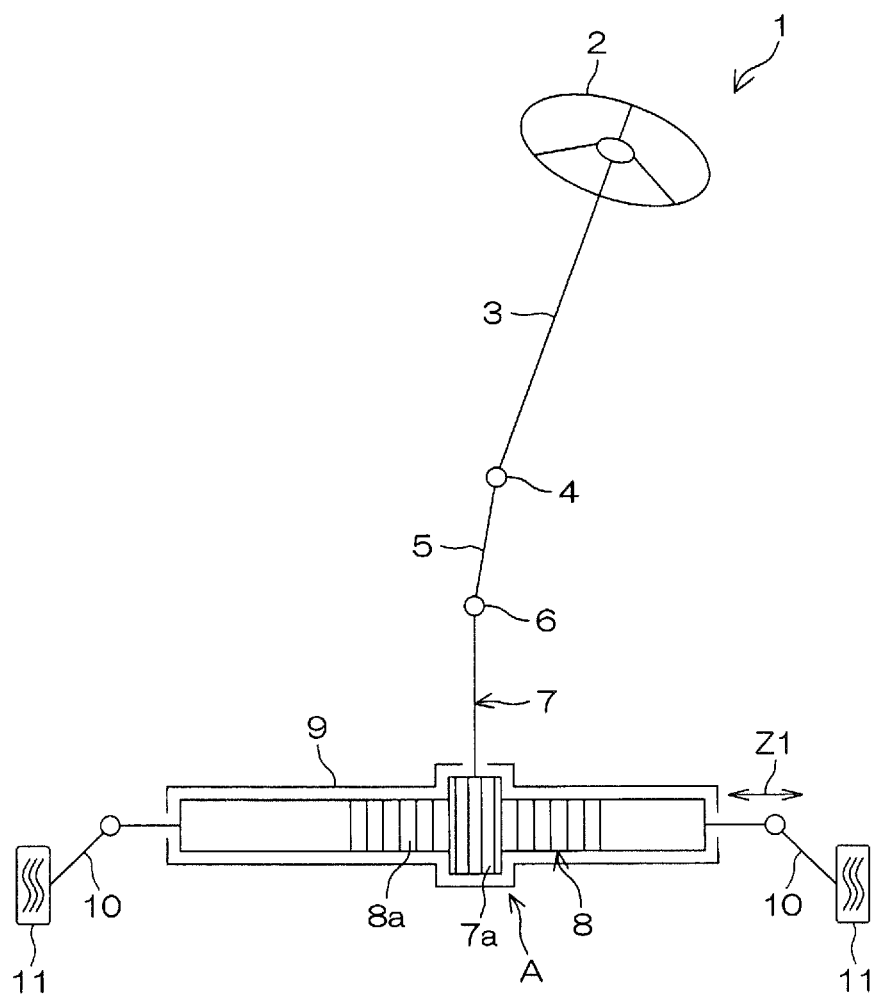
FIG. 1 is a view schematically illustrating the configuration of a rack-and-pinion-type steering system according to a first embodiment of the invention.

Hereinafter, example embodiments of the invention will be described with reference the accompanying drawings. As illustrated in FIG. 1, a steering system 1 includes a steering shaft 3, an intermediate shaft 5, a pinion shaft 7 and a rack shaft 8. The steering shaft 3 is coupled to a steering member 2 such as a steering wheel. The intermediate shaft 5 is coupled to the steering shaft 3 via a universal joint 4. The pinion shaft 7 is coupled to the intermediate shaft 5 via a universal joint 6. The rack shaft 8 has a rack 8a that is meshed with a pinion 7a provided on the pinion shaft 7 at a position near one end of the pinion shaft 7. The rack shaft 8 serves as a steered shaft extending in the lateral direction of a vehicle. The pinion shaft 7 and the rack shaft 8 constitute a rack-and-pinion mechanism A that serves as a steering mechanism.

The rack shaft 8 is held via a plurality of bearings (not illustrated) by a rack housing 9 secured to a vehicle body so as to be allowed to make a linear reciprocating motion along an axial direction Z1. Opposite end portions of the rack shaft 8 protrude on the opposite sides from the rack housing 9, and tie rods 10 are respectively coupled to the opposite end portions of the rack shaft 8. The tie rods 10 are linked to corresponding steered wheels 11 via corresponding knuckle arms (not illustrated).

Figure 2:
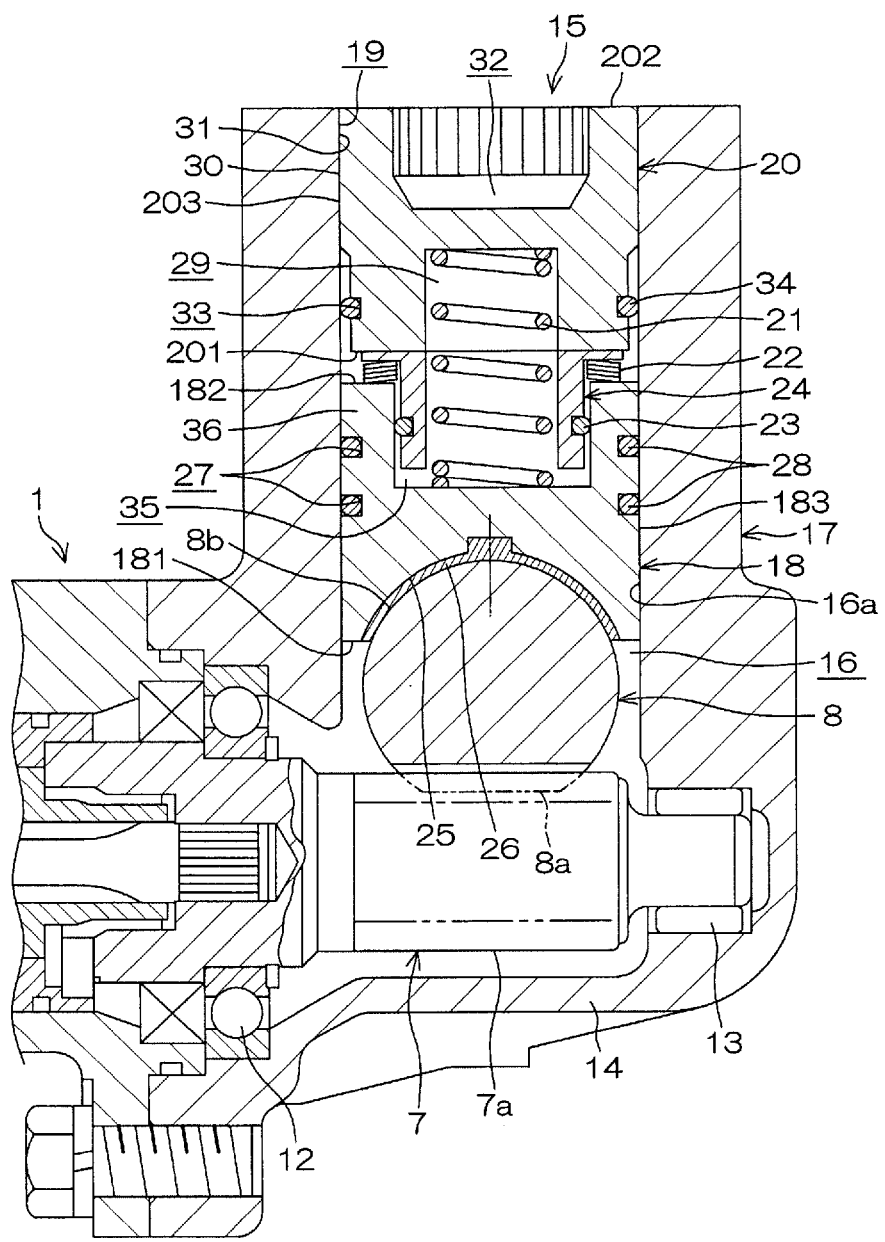
FIG. 2 is a sectional view illustrating main portions of the steering system including a rack guide unit.

When the steering shaft 3 is rotated in response to an operation of the steering member 2, the rotation of the steering shaft 3 is converted into a linear motion of the rack shaft 8 in the axial direction Z1 by the pinion 7a and the rack 8a. Thus, the steered wheels 11 are steered. FIG. 2 is a sectional view of main portions of the steering system 1 according to a first embodiment of the invention. As illustrated in FIG. 2, the pinion shaft 7 is rotatably held by a first bearing 12 and a second bearing 13 in a pinion housing 14. The first bearing 12 is, for example, a ball bearing, and the second bearing 13 is, for example, a cylindrical roller bearing. The pinion 7a of the pinion shaft 7 and the rack 8a of the rack shaft 8 are meshed with each other in the pinion housing 14.

The steering system 1 includes a rack guide unit 15. The rack guide unit 15 includes a housing 17 and a rack guide 18. The housing 17 defines an accommodation portion 16 that is a circular hole through which the rack shaft 8 is passed. The rack guide 18 is accommodated in the accommodation portion 16 so as to be allowed to approach and move away from the rack shaft 8. A back side 8b of the rack shaft 8, which is on the opposite side of the rack shaft 8 from the rack 8a, is slidably supported by the rack guide 18. The rack guide unit 15 includes a closure member 20, a compression coil spring 21 and at least one coned disc spring 22 (in the present invention, a plurality of coned disc springs 22 is provided). The closure member 20 is a plug fitted to an external opening end 19 of the accommodation portion 16. The external opening end 19 is located on the opposite side of the accommodation portion 16 from the rack shaft 8. The compression coil spring 21 and the coned disc springs 22 are interposed between the rack guide 18 and the closure member 20. The rack guide unit 15 includes a holding member 24 that supports the coned disc springs 22 and that is frictionally engaged with and held by the rack guide 18 via an annular elastic member 23 that may function as a frictionally engaging member.

The housing 17 of the rack guide unit 15 and the pinion housing 14 are made of the same material and formed as a single-piece member. The housing 17 is disposed on the opposite side of the rack shaft 8 from the pinion shaft 7. The pinion housing 14 and the housing 17 are formed by, for example, die casting. The rack guide 18 has a first face 181, a second face 182, and an outer peripheral face 183 that is a cylindrical face. The first face 181 is opposed to the rack shaft 8. The second face 182 is located on the opposite side of the rack guide 18 from the first face 181. A concave face 25 having a shape that conforms to the shape of the back side 8b of the rack shaft 8 is formed in the first face 181a of the rack guide 18. A curved sliding plate 26 is attached to the concave face 25 so as to conform to the concave face 25. The sliding plate 26 is in sliding contact with the back side 8b of the rack shaft 8. Preferably, a plate having a low frictional coefficient is used as the sliding plate 26. For example, a metal plate or a metal plate coated with a fluorine resin may be used as the sliding plate 26.

Annular elastic members 28 such as O-rings are respectively accommodated and held in multiple annular accommodation grooves 27 formed in the outer peripheral face 183 of the rack guide 18. The rack guide 18 has an outer diameter that is slightly smaller than the inner diameter of the accommodation portion 16. As the elastic members 28 slide on an inner periphery 16a of the accommodation portion 16, the rack guide 18 moves in the accommodation portion 16 in such directions as to approach and move away from the rack shaft 8. The elastic members 28 has the function of restraining the rack guide 18 from tilting within the accommodation portion 16.

Figure 3:
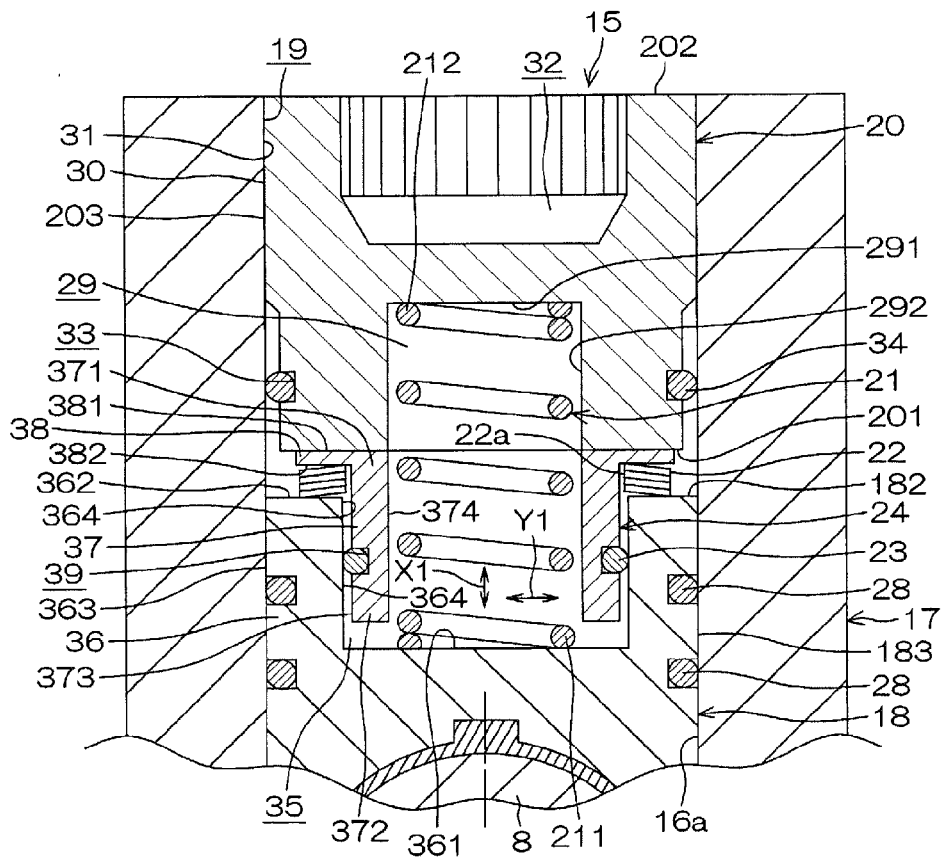
FIG. 3 is an enlarged sectional view of the rack guide unit.

As illustrated in FIG. 3 that is an enlarged view illustrating part of the rack guide unit 15 in FIG. 2, an accommodation recessed portion 29 that is, for example, a circular hole, in which part of the compression coil spring 21 is accommodated, is formed in a first face 201 of the closure member 20. The compression coil spring 21 has a first end portion 211 and a second end portion 212. The second end portion 212 is received by a bottom 291 of the accommodation recessed portion 29. An inner periphery 292 of the accommodation recessed portion 29 has the function of guiding radially outer portions of the compression coil spring 21.

As illustrated in FIG. 2 and FIG. 3, the closure member 20 is a plug that has the first face 201 and a second face 202. The first face 201 is opposed to the second face 182 of the rack guide 18. The second face 202 is located on the opposite side of the closure member 20 from the first face 201. The closure member 20 has an external thread 30 formed on its outer periphery 203. In addition, an internal thread 31 is formed in the inner periphery 16a of accommodation portion 16, within a range from the external opening end 19 to a position that is apart from the external opening end 19 by a prescribed distance. The external thread 30 of the closure member 20 is screwed to the internal thread 31 to secure the closure member 20 to the housing 17.

A tool engagement hole 32 having a polygonal sectional shape, in which a tool for screwing the closure member 20 to the housing 17 is engaged, is formed in the second face 202 of the closure member 20. A seal member 34 formed of an annular elastic member such as an O-ring is accommodated and held in at least one annular accommodation groove 33 formed in the outer periphery 203 of the closure member 20 (corresponding to an outer periphery 363 of a tubular portion 36 that will be described later). The seal member 34 has the function of providing sealing between the outer periphery 203 of the closure member 20 and the inner periphery 16a of the accommodation portion 16.

An accommodation recessed portion 35 is formed in the second face 182 of the rack guide 18. The accommodation recessed portion 35 is recessed toward the first face 181, and accommodates part of the compression coil spring 21 and part of the holding member 24. Thus, the rack guide 18 has the bottomed tubular portion 36 that surrounds the circumference of the accommodation recessed portion 35. The second end portion 212 of the compression coil spring 21 is received by a bottom 361 of the tubular portion 36 (corresponding to the bottom of the accommodation recessed portion 35). That is, the compression coil spring 21 is interposed, in a compressed state, between the bottom 361 of the tubular portion 36 of the rack guide 18 and the bottom 291 of the accommodation recessed portion 29 of the closure member 20 so as to elastically urge the rack guide 18 toward the rack shaft 8.

An end face 362 of the tubular portion 36 of the rack guide 18 (corresponding to the second face 182 of the rack guide 18) has an annular shape so as to surround circumference of the accommodation recessed portion 35. The end face 362 serves as a seat that receives the coned disc springs 22. The holding member 24 has a guide tube 37 and a seat plate 38. The guide tube 37 guides radially inner portions 22a (radially inner end portions) of the coned disc springs 22. The seat plate 38 extends outward in a radial direction Y1 from a first end portion 371 of the guide tube 37 in an axial direction X1 (corresponding to an end portion on the closure member 20 side), and receives the coned disc springs 22.

The coned disc springs 22 and the seat plate 38 are interposed between the end face 362 (seat portion) of the tubular portion 36 of the rack guide 18 and the first face 201 of the closure member 20. The seat plate 38 extends along the first face 201 of the closure member 20, and is interposed between the coned disc springs 22 and first face 201 of the closure member 20. The seat plate 38 has a first face 381 and a second face 382. The first face 381 extends along the first face 201 of the closure member 20. The second face 382 is a seat face that receives a load from the coned disc springs 22. The distance between the end face 362 (seat portion) of the tubular portion 36 and the second face 382 of the seat plate 38 is set larger than the total thickness of the coned disc springs 22 that are in closed contact with each other.

When the closure member 20 is made of, for example, aluminum, the seat plate 38 has the function of suppressing occurrence of abrasion of the first face 201 of the closure member 20 by preventing the first face 201 of the closure member 20 from being brought into contact with the coned disc springs 22. Thus, the holding member 24 including the seat plate 38 is made of, for example, steel or resin. A major portion of the guide tube 37 is inserted and accommodated in the accommodation recessed portion 35 of the rack guide 18. The compression coil spring 21 is passed through the guide tube 37. A prescribed clearance is formed between an inner periphery 374 of the guide tube 37 and the radially outer portions of the compression coil spring 21.

The guide tube 37 has a second end portion 372 which is located on the opposite side of the guide tube 37 from the first end portion 371 from which the seat plate 38 extends. A clearance having a width, for example, equal to or larger than a degree of displacement of the rack guide 18 is formed between the second end portion 372 of the guide tube 37 and the bottom 361 of the tubular portion 36, in a direction in which the rack guide 18 is displaced (corresponding to the depth direction of the circular hole that is the accommodation portion 16). An inner periphery 364 of the tubular portion 36 of the rack guide 18 may function as an opposed portion that is opposed to an outer periphery 373 of the guide tube 37 across a prescribed clearance. The elastic member 23, which may function as the fictionally engaging member, is held in an accommodation groove 39 formed in the outer periphery 373 of the guide tube 37. The elastic member 23 is frictionally engaged with the inner periphery 364 (opposed portion) of the tubular portion 36. The elastic member 23 is, for example, an O-ring. The elastic member 23 may be elastically compressed between the inner periphery 364 of the tubular portion 36 and the outer periphery 373 of the guide tube 37. However, the elastic member 23 need not be elastically compressed between the inner periphery 364 of the tubular portion 36 and the outer periphery 373 of the guide tube 37.

Figure 4:
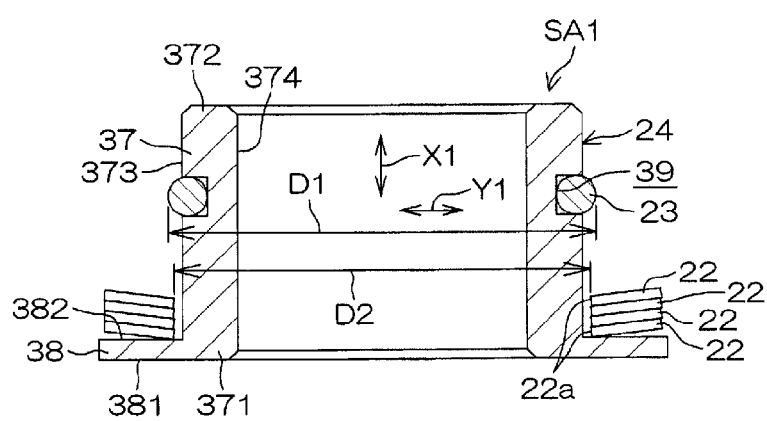
FIG. 4 is a sectional view of a first subassembly including coned disc springs, a holding member and an elastic member (frictionally engaging member)

As illustrated in FIG. 4, the coned disc springs 22, the elastic member 23 (frictionally engaging member) and the holding member 24 constitute a subassembly SA1 that can be handled as a single unit body. Specifically, the coned disc springs 22 and the elastic member 23 are disposed on the same side of the guide tube 37 in the radial direction Y1 (radially outward of the guide tube 37 in the present embodiment). The coned disc springs 22 are disposed between the elastic member 23 and the seat plate 38 in the axial direction X1 of the guide tube 37.

In the state of the subassembly SA1, part of the elastic member 23 (frictionally engaging member) is overlapped with part of the coned disc springs 22 as viewed from the axial direction X1 of the guide tube 37. That is, an outer diameter D1 of the annular elastic member 23 held in the accommodation groove 39 formed in the outer periphery 373 of the guide tube 37 of the holding member 24 is set larger than an inner diameter D2 of the coned disc springs 22 (D1>D2). Thus, the coned disc springs 22 are restrained, by the elastic member 23, from coming off the guide tube 37.

Figure 5:
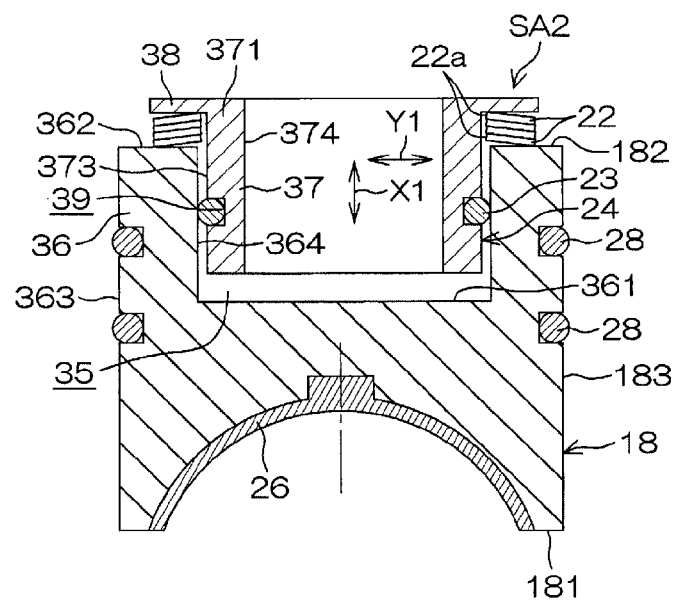
FIG. 5 is a sectional view of a second subassembly including coned disc springs, a holding member, an elastic member (frictionally engaging member), and a closure member.

As illustrated in FIG. 5, the elastic member 23 (frictionally engaging member) retained by the holding member 24 (in the accommodation groove 39 of the guide tube 37) is frictionally engaged with (the inner periphery 364 of the tubular portion 36 of) the rack guide 18. Thus, the coned disc springs 22, the elastic member 23, the holding member 24, the rack guide 18 and the elastic members 28 constitute a second subassembly SA2 that can be handled as a single unit body. The second subassembly SA2 is larger in scale than the first subassembly SA1. During assembly of the rack guide unit 15, at first, the subassembly SA1 is assembled, and then the subassembly SA2 is assembled by combining the first subassembly SA2 with the rack guide 18.

According to the present embodiment, the holding member 24 that holds the coned disc springs 22 is held by the rack guide 18 through frictional engagement such that the holding member 24 and the coned disc springs 22 constitute a single unit. Through a simple work of frictionally engaging the holding member 24 with the rack guide 18, the coned disc springs 22, the holding member 24, the rack guide 18 and the like are easily assembled into a single unit that is a subassembly (corresponding to the second subassembly SA2). Thus, it is possible to enhance the efficiency of assembly of the rack guide unit 15 as a whole. Consequently, it is possible to enhance the efficiency of assembly of the steering system 1.

In the case where a plurality of the coned disc springs 22 is used, the coned disc springs 22, which are easily separated from each other, can be held in a bundle. Therefore, the coned disc springs 22 are restrained from being misaligned from each other during an operation of the rack guide unit 15. When a high load is input in the rack guide 18 from the rack shaft 8 side and the rack guide 18 is displaced relative to the holding member 24, which is restrained by the closure member 20 from moving toward the closure member 20, the elastic member 23, which may function as the frictionally engaging member, is slid under friction on (the inner periphery 364 of the tubular portion 36 of) the rack guide 18 to produce a frictional resistance load. In the case where a plurality of the coned disc springs 22 is used, contact faces of the coned disc springs 22 frictionally slide on each other in response to compressive displacement of the coned disc springs 22 to produce a frictional resistance load. As a result, there is the frictional resistance load produced by the coned disc springs 22 in addition to the frictional resistance load produced by the elastic member 23. Both the frictional resistance load produced by the elastic member 23 (frictionally engaging member) and the frictional resistance load produced by the coned disc springs 22 serve as a counteracting load that counters an input load from the rack shaft 8 side. Thus, the total counteracting load including the counteracting load produced by the compression coil spring 21 and the counteracting load produced by the coned disc springs 22 is increased as a whole.

In particular, when a high load is input in the rack guide 18 from the rack shaft 8 side, the frictional load produced by the frictional engagement between the rack guide 18 and the elastic member 23 is added to a load produced by the compressed coned disc springs 22. Thus, the counteracting load against the high load is increased. The rack guide 18 is returned to the rack shaft 8 smoothly. The holding member 24 that holds the coned disc springs 22 is held by the rack guide 18 via the frictionally engaging member (elastic member 23).

Because the elastic member 23, which may function as the frictionally engaging member, is used, it is possible to absorb variations in the dimensional accuracy of the holding member 24 (specifically, the outer periphery 373 of the guide tube 37 of the holding member 24) and the rack guide 18 (specifically, the inner periphery 364 of the tubular portion 36 of the rack guide 18). As a result, the holding member 24 is reliably held by the rack guide 18. The holding member 24 has the guide tube 37 and the seat plate 38. The guide tube 37 guides the radially inner portions 22a (radially inner end portions) of the coned disc springs 22. The seat plate 38 extends radially outward from the one end of the guide tube 37 in the axial direction X1 to receive a load from the coned disc springs 22. The seat plate 38 prevents occurrence of abrasion or the like of the closure member 20 (specifically, the first face 201 of the closure member 20) caused by the coned disc springs 22.

Although not illustrated, a spacer that is, for example, an annular resin plate may be interposed between the coned disc springs 22 and the end face 362 of the tubular portion 36 of the rack guide 18 to reduce abrasion of the end face 362 of the tubular portion 36 of the rack guide 18, when the rack guide 18 is made of aluminum. The rack guide 18 includes the opposed portion (the inner periphery 364 of the tubular portion 36) that is opposed to the outer periphery 373 of the guide tube 37. The elastic member 23 (frictionally engaging member) is interposed between the outer periphery 373 of the guide tube 37 and the opposed portion of the rack guide 18 (the inner periphery 364 of the tubular portion 36). Thus, the guide tube 37 and the opposed portion of the rack guide 18 (the inner periphery 364 of the tubular portion 36) can be overlapped with each other in the axial direction X1. As a result, it is possible to reduce the size of the rack guide unit 15 in the axial direction X1 (the depth direction of the circular hole that serves as the accommodation portion 16).

The coned disc springs 22 and the elastic member 23 are disposed on the same side of the guide tube 37 in the radial direction Y1 (radially outward of the guide tube 37 in the present embodiment). In the state where the coned disc springs 22 are interposed between the elastic member 23 and the seat plate 38 in the axial direction X1 of the guide tube 37, part of the elastic member 23 (frictionally engaging member) is overlapped with part of the coned disc springs 22 as viewed from the axial direction X1 of the guide tube 37. That is, the outer diameter D1 of the annular elastic member 23 that is held in the accommodation groove 39 formed in the outer periphery 373 of the guide tube 37 of the holding member 24 is set larger than the inner diameter D2 of the coned disc springs 22 (D1>D2). Thus, the coned disc springs 22 are restrained from coming off the guide tube 37. As a result, it is possible to constitute a subassembly (corresponding to the subassembly SA1) that includes the coned disc springs 22, the elastic member 23 (frictionally engaging member) and the holding member 24 and that can be handled as a single unit body. Thus, it is possible to enhance the efficiency of assembly.

The compression coil spring 21 that is interposed between the closure member 20 and the rack guide 18 and that urges the rack guide 18 toward the rack shaft 8 and the coned disc springs 22 are both used. Thus, the flexibility in setting a load is enhanced.

Figure 6:
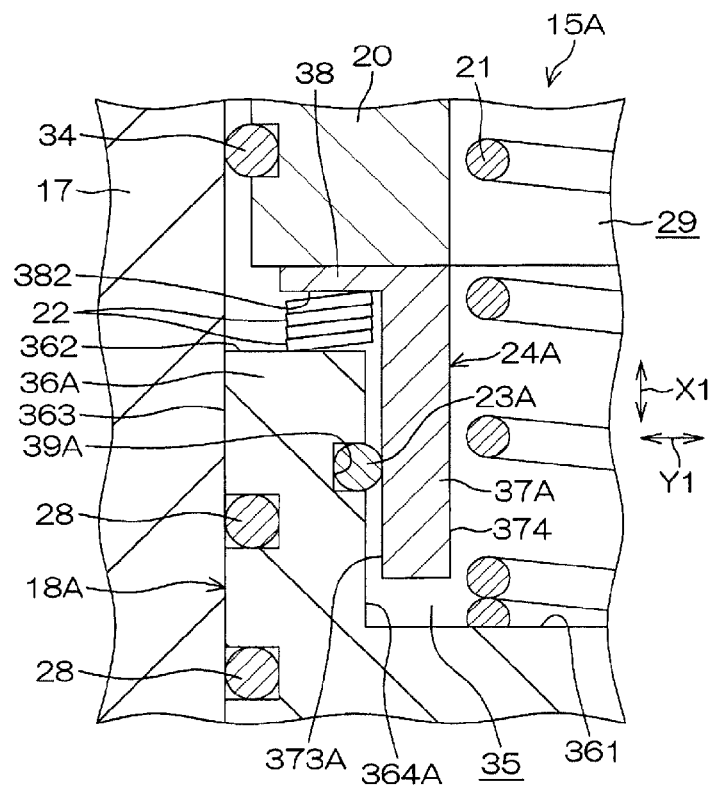
FIG. 6 is a sectional view of main portions of a rack guide unit according to a second embodiment of the invention, illustrating a modified example of the first embodiment illustrated in FIG. 3.

FIG. 6 is sectional view of main portions of a rack guide unit 15A according to a second embodiment of the invention. The second embodiment illustrated in FIG. 6 differs from the first embodiment illustrated in FIG. 3 mainly in the following configurations. In the first embodiment illustrated in FIG. 3, the elastic member 23, which may function as the frictionally engaging member, is held in the accommodation groove 39 formed in the outer periphery 373 of the guide tube 37 of the holding member 24, and is frictionally engaged with the inner periphery 364 of the tubular portion 36 of the rack guide 18. In contrast to this, in the second embodiment illustrated in FIG. 6, an elastic member 23A, which may function as the frictionally engaging member, is held in an accommodation groove 39A formed in an inner periphery 364A of a tubular portion 36A of a rack guide 18A, and is frictionally engaged with an outer periphery 373A of a guide tube 37A of a holding member 24A. Note that, the same components in the second embodiment in FIG. 6 as those in the first embodiment will be denoted by the same reference symbols as those in the first embodiment.

In the second embodiment, because the elastic member 23A is held by the rack guide 18A, the first assembly SA1 as illustrated in FIG. 4 in the first embodiment cannot be formed. Except for this point, the second embodiment produces the same advantageous effects as those of the first embodiment.

Figure 7:
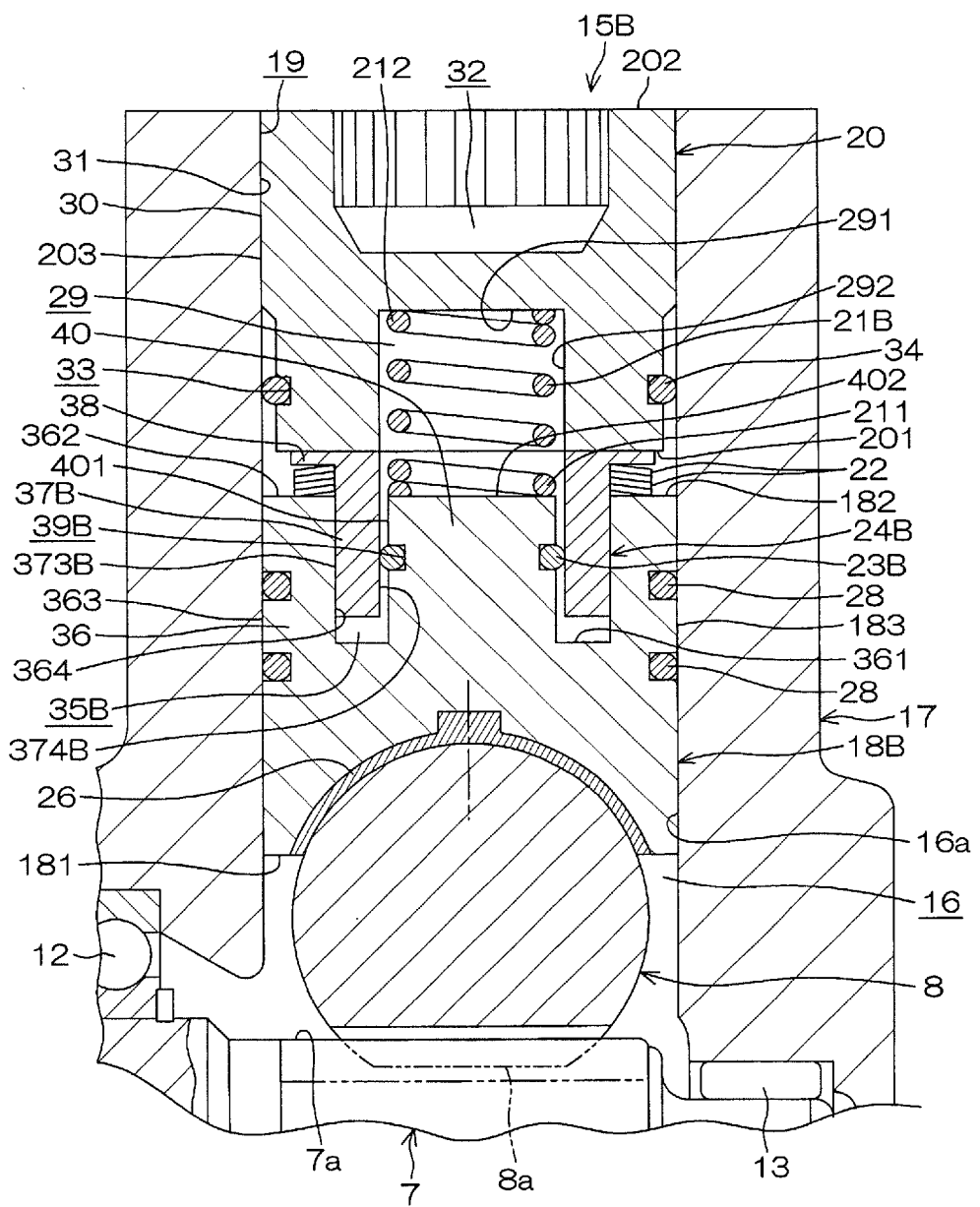
FIG. 7 is a sectional view of main portions of a rack guide unit according to a third embodiment of the invention.

FIG. 7 is a sectional view of main portions of a rack guide unit 15B according to a third embodiment of the invention. As illustrated in FIG. 7, the third embodiment differs from the first embodiment illustrated in FIG. 3 mainly in that a rack guide 18B has a protrusion 40 that is protruded into the tubular portion 36 to form an annular accommodation recessed portion 35B between the protrusion 40 and the tubular portion 36. An elastic member 23B (for example, an O-ring), which may function as the frictionally engaging member, is held in an accommodation groove 39B formed in an outer periphery 401 of the protrusion 40. The elastic member 23B is frictionally engaged with an inner periphery 374B of a guide tube 37B of a holding member 24B.

An outer periphery 373B of a guide tube 37B of the holding member 24B is fitted to the inner periphery 364 of the tubular portion 36 so as to be displaceable in the axial direction. The protrusion 40 has an end face 402 that is opposed to the bottom 291 of the accommodation recessed portion 29 of the rack guide 18. A compression coil spring 21B that urges the rack guide 18 toward the rack shaft 8 is interposed, in a compressed state, between the end face 402 of the protrusion 40 and the bottom 291 of the accommodation recessed portion 29.

The same components in the third embodiment illustrated in FIG. 7 as those in the second embodiment illustrated in FIG. 3 will be denoted by the same reference symbols as those in the second embodiment illustrated in FIG. 3. In the third embodiment, because the elastic member 23B is held by the rack guide 18B, the first subassembly SA1 as illustrated in FIG. 4 in the first embodiment cannot be formed. Except for this point, the third embodiment produces the same advantageous effects as those of the first embodiment.

Figure 8:
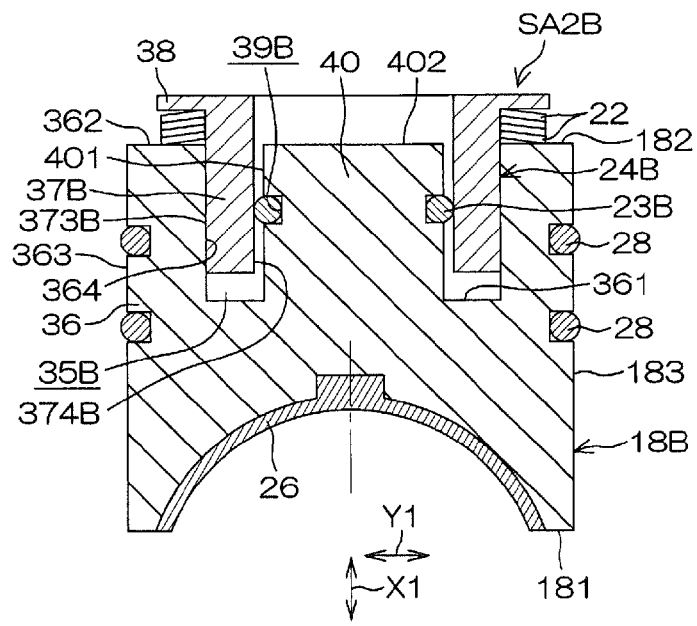
FIG. 8 is a sectional view of a second subassembly including coned disc springs, a holding member, an elastic member (frictionally engaging member), and a closure member in the third embodiment illustrated in FIG. 7.

In the present embodiment as well, for example, the elastic member 23B (frictionally engaging member) held by the rack guide 18B is frictionally engaged with the holding member 24B as illustrated in FIG. 8. Thus, the coned disc springs 22, the elastic member 23B, the holding member 24B, the rack guide 18B and the seal members 28 constitute a second subassembly SA2B that can be handled as a single unit body. That is, according to the present embodiment, through a simple work of frictionally engaging the holding member 24B that holds the coned disc springs 22 with the rack guide 18, the coned disc springs 22, the holding member 24B, the rack guide 18B are easily assembled into a subassembly (corresponding to the second subassembly SA2B). Thus, it is possible to enhance the efficiency of assembly as a whole.

Because the guide tube 37B of the holding member 24B is inserted into the annular accommodation recessed portion 35B, the guide tube 37B is restrained from tilting. Thus, the holding member 24B is smoothly displaced in the axial direction X1.

Figure 9:
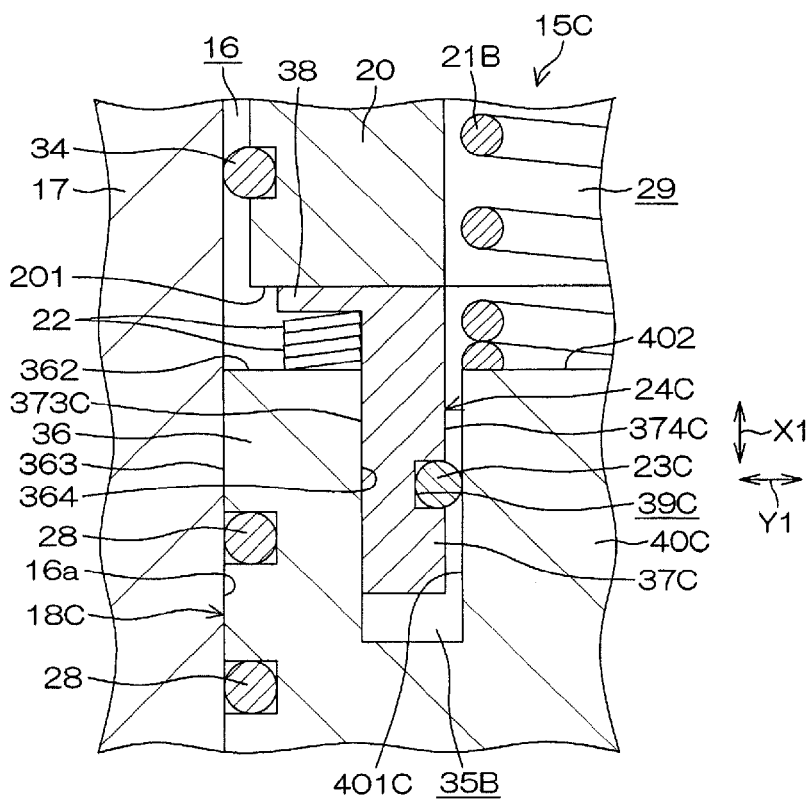
FIG. 9 is a sectional view of a rack guide unit according to a fourth embodiment of the invention, illustrating a modified example of the third embodiment illustrated in FIG. 7.

FIG. 9 is a sectional view illustrating main portions of a rack guide unit 15C according to a fourth embodiment of the invention. The fourth embodiment illustrated in FIG. 9 differs from the third embodiment illustrated in FIG. 7 mainly in the following configurations. In the third embodiment illustrated in FIG. 7, the elastic member 23B, which may function as the elastically engaging member, is held in the accommodation groove 39B formed in the outer periphery 401 of the protrusion 40 of the rack guide 18B and is frictionally engaged with the inner periphery 374B of the guide tube 37B of the holding member 24B. In contrast to this, in the fourth embodiment illustrated in FIG. 9, an elastic member 23C is held in an accommodation groove 39C formed in an inner periphery 374C of a guide tube 37C of a holding member 24C, and is frictionally engaged with an outer periphery 401C of a protrusion 40C of a rack guide 18C. An outer periphery 373C of the guide tube 37C is fitted to the inner periphery 364 of the tubular portion 36 so as to be displaceable in the axial direction X1. The same components in the fourth embodiment illustrated in FIG. 9 as those in the third embodiment illustrated in FIG. 7 will be denoted by the same reference symbols as those in the third embodiment illustrated in FIG. 7.

According to the fourth embodiment, because the elastic member 23C is held by the holding member 24C, a subassembly similar to the first subassembly SA1 illustrated in FIG. 4 in the first embodiment can be formed. Thus, the fourth embodiment produces the same advantageous effects as those in the first embodiment.

Figure 10:
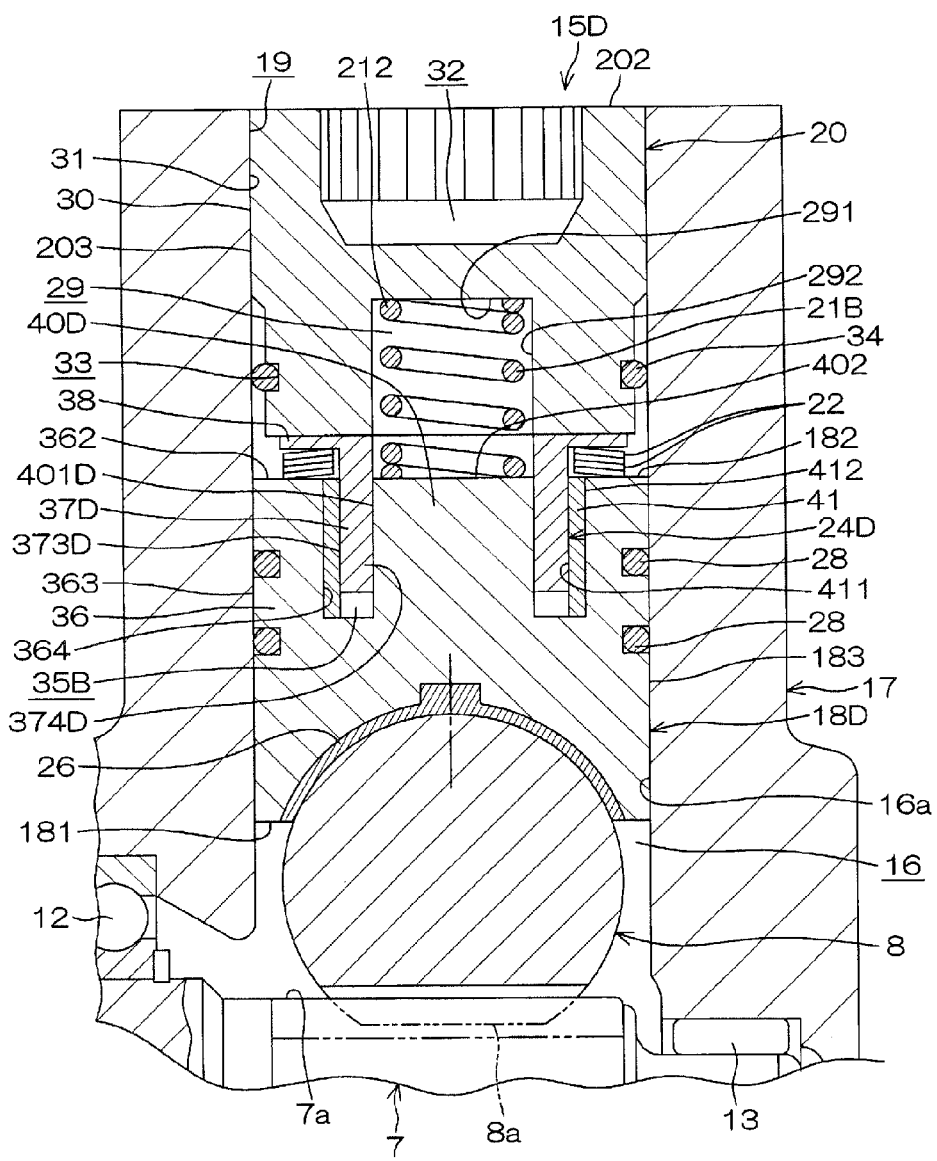
FIG. 10 is a sectional view of main portions of a rack guide unit according to a fifth embodiment of the invention.

FIG. 10 is a sectional view illustrating main portions of a rack guide unit 15D according to a fifth embodiment of the invention. The fifth embodiment illustrated in FIG. 10 differs from the third embodiment illustrated in FIG. 7 mainly in the following configurations. In the third embodiment illustrated in FIG. 7, the elastic member 23B held in the accommodation groove 39B of the outer periphery 401 of the protrusion 40 of the rack guide 18D is frictionally engaged with the inner periphery 374B of the guide tube 37B of the holding member 24B. In contrast to this, in the fifth embodiment illustrated in FIG. 10, an outer periphery 412 of a rolled bushing 41, which may function as the frictionally engaging member, is press-fitted and fixed to the inner periphery 364 of the tubular portion 36 of a rack guide 18D. The inner periphery 411 of the rolled bushing 41 is frictionally engaged with an outer periphery 373D of a guide tube 37D of a holding member 24D. An inner periphery 374D of the guide tube 37D is fitted to the outer periphery 401D of the protrusion 40D (corresponding to the protrusion 40C in the embodiment illustrated in FIG. 9) so as to be displaceable in the axial direction X1.

As long as the inner periphery 411 of the rolled bushing 41 can be frictionally engaged with the outer periphery 373D of the guide tube 37D, the rolled bushing 41 may be formed of a metal layer that serves as a frictionally engaging layer. The inner periphery 411 of the rolled bushing 41 may be formed of a resin layer, which serves as a frictionally engaging layer having elasticity in the radial direction, so that the rolled bushing 41 serves as an elastic member. The same components in the fifth embodiment illustrated in FIG. 10 as those in the third embodiment illustrated in FIG. 7 will be denoted by the same reference symbols as those in the third embodiment illustrated in FIG. 7.

Figure 11:
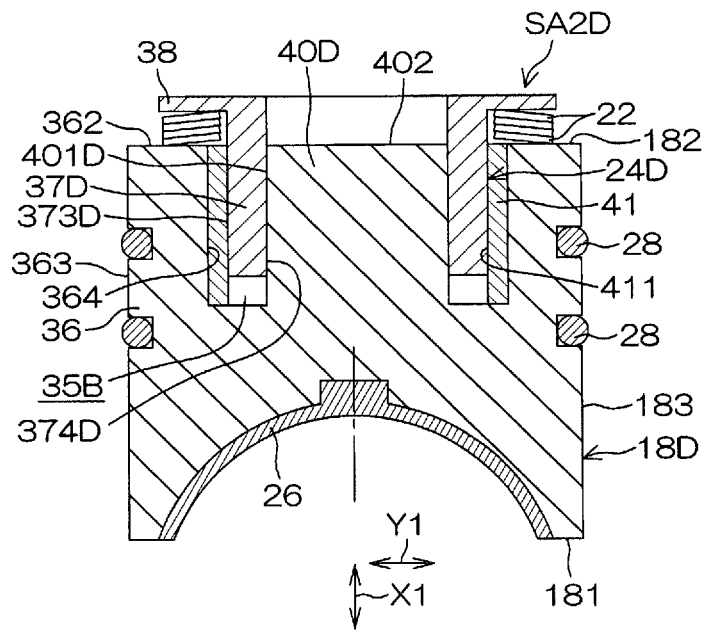
FIG. 11 is a sectional view of a second subassembly including coned disc springs, a holding member, an elastic member (frictionally engaging member), and a closure member in the fifth embodiment illustrated in FIG. 10.

In the present embodiment, as illustrated in FIG. 11, the rolled bushing 41 (the frictionally engaging member, the elastic member) held by the rack guide 18D is frictionally engaged with the holding member 24D. Thus, the coned disc springs 22, the rolled bushing 41, the holding member 24D, the rack guide 18D and the seal members 28 constitute a second subassembly SA2D that can be handled as a single unit body.

That is, according to the present embodiment, through a simple work of frictionally engaging the holding member 24D that holds the coned disc springs 22 with the rack guide 18, the coned disc springs 22, the holding member 24D, and the rack guide 18D are easily assembled into a single unit that is a subassembly (corresponding to the second subassembly SA2D). Thus, it is possible to enhance the efficiency of assembly of the rack guide unit 15D as a whole.

Figure 12:
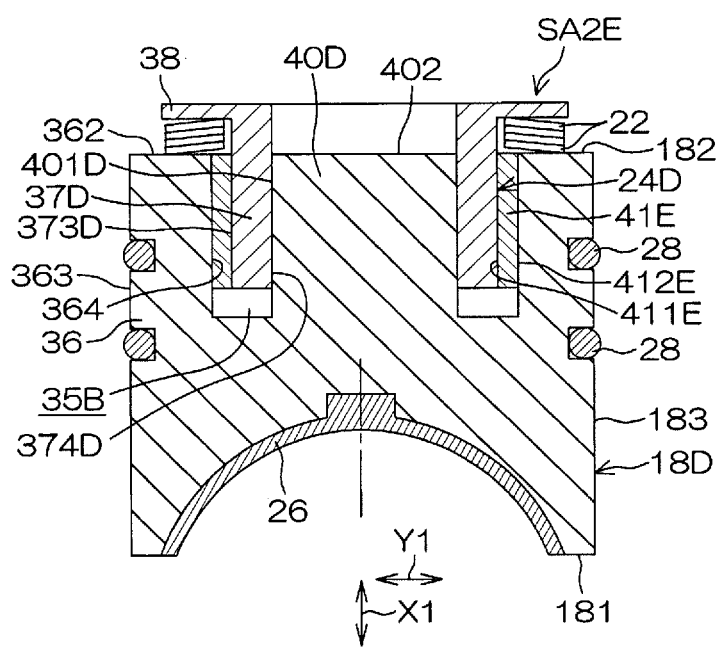
FIG. 12 is a sectional view of a first subassembly according to a sixth embodiment of the invention.
Figure 13:
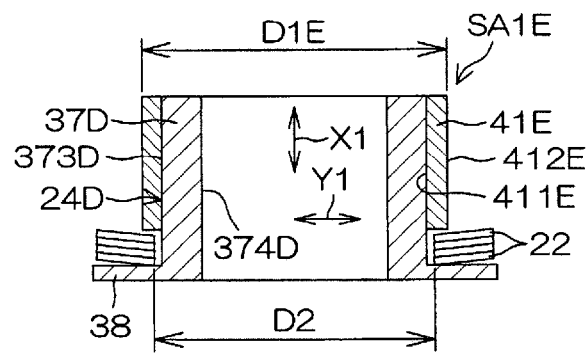
FIG. 13 is a sectional view of a second subassembly including the first subassembly in the sixth embodiment illustrated in FIG. 12.

FIG. 12 and FIG. 13 illustrate a second subassembly SAE2 and a first subassembly SA1E according to a sixth embodiment of the invention. The sixth embodiment differs from the fifth embodiment illustrated in FIG. 10 and FIG. 11 mainly in the following configurations. In the fifth embodiment illustrated in FIG. 11, the rolled bushing 41 is press-fitted to and held by the rack guide 18D, and is frictionally engaged with the holding member 24D. In contrast to this, in the sixth embodiment illustrated in FIG. 12, a rolled bushing 41E, which may function as the frictionally engaging member, is press-fitted to and held by the holding member 24D, and is frictionally engaged with the rack guide 18D. Specifically, an inner periphery 411E of the rolled bushing 41E is press-fitted to and held by the outer periphery 373D of the guide tube 37D. Further, an outer periphery 412E of the rolled bushing 41E is frictionally engaged with the inner periphery 364 of the tubular portion 36 of the rack guide 18D. Thus, a second subassembly SA2E including the coned disc springs 22, the holding member 24D, the rolled bushing 41E, the rack guide 18D and the seal members 28 is formed.

As illustrated in FIG. 13, an outer diameter ME of the rolled bushing 41E held by the outer periphery 373D of the guide tube 37D is set larger than the inner diameter D2 of each of the coned disc springs 22 that surround the outer periphery 373D of the guide tube 37D (D1E>D2). As a result, the rolled bushing 41E restrains the coned disc springs 22 from coming off the guide tube 37D. Thus, the first subassembly SA1E including the coned disc springs 22, the rolled bushing 41E and the holding member 24D is formed.

Figure 14:
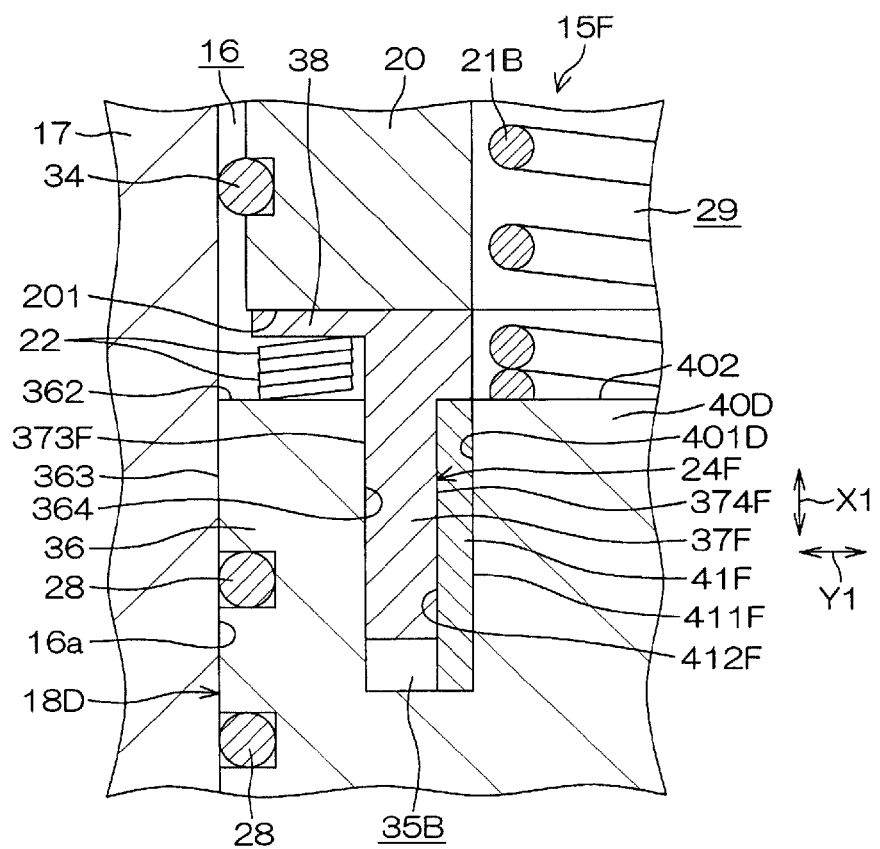
FIG. 14 is a sectional view of main portions of a rack guide unit according to a seventh embodiment of the invention, illustrating a modified example of the fifth embodiment illustrated in FIG. 10.

FIG. 14 is a sectional view illustrating main portions of a rack guide unit 15F according to a seventh embodiment of the invention. The seventh embodiment illustrated in FIG. 14 differs from the fifth embodiment illustrated in FIG. 10 mainly in the following configurations. In the rack guide unit 15D in the fifth embodiment illustrated in FIG. 10, the rolled bushing 41, which may function as the frictionally engaging member, is held by the inner periphery 364 of the tubular portion 36 of the rack guide 18D, and is frictionally engaged with the outer periphery 373D of the guide tube 37D of the holding member 24D. In contrast to this, in the rack guide unit 15F in the seventh embodiment illustrated in FIG. 14, there is provided a rolled bushing 41E, which may function as the frictionally engaging member and which is held by the outer periphery 401D of the protrusion 40D. Specifically, an inner periphery 411F of the rolled bushing 41F is press-fitted to and held by the outer periphery 401D of the protrusion 40D. An outer periphery 412F of the rolled bushing 41F is frictionally engaged with an inner periphery 374F of a guide tube 37F of a holding member 24F. An outer periphery 373F of the guide tube 37F is fitted to the inner periphery 364 of the tubular portion 36 so as to be displaceable in the axial direction X1.

The same components in the seventh embodiment illustrated in FIG. 14 as those in the fifth embodiment illustrated in FIG. 10 will be denoted by the same reference symbols as those in the fifth embodiment illustrated in FIG. 10. The seventh embodiment produces the same advantageous effects as those in the fifth embodiment illustrated in FIG. 10.

Figure 15:
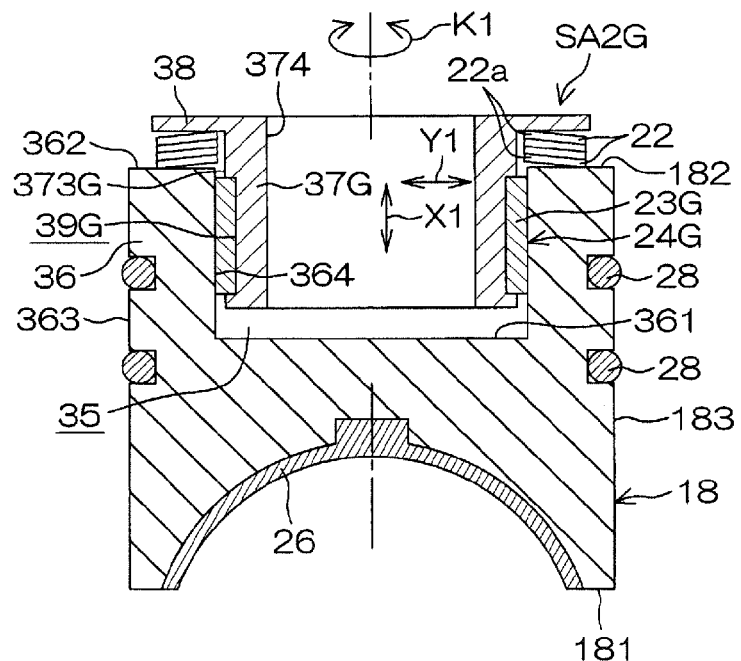
FIG. 15 is a sectional view of a second subassembly according to an eighth embodiment of the invention.
Figure 16:
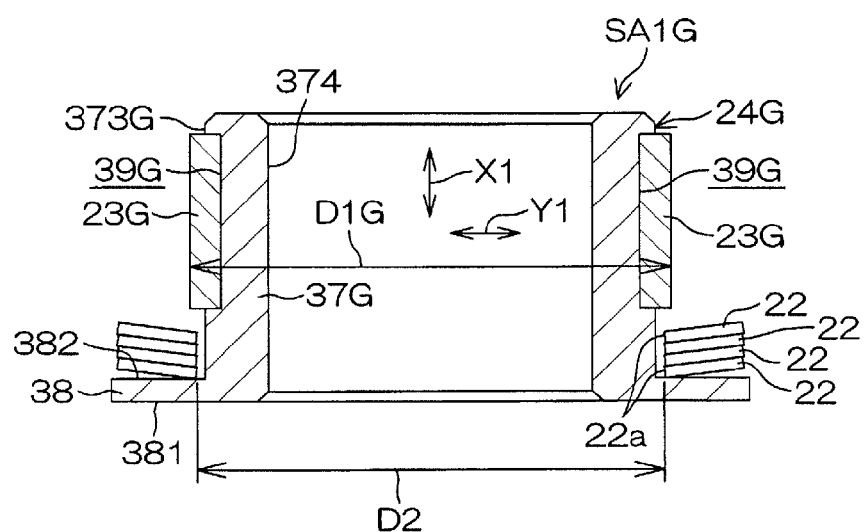
FIG. 16 is a sectional view of a first subassembly included in the second subassembly in the eighth embodiment illustrated in FIG. 15.

In the first to seventh embodiments, the elastic member, which may function as the frictionally engaging member, has an annular shape. However, as in an eighth embodiment of the invention, an elastic member that is not annular may be used as an elastic member, which may function as the frictionally engaging member. FIG. 15 and FIG. 16 respectively illustrate a second subassembly SA2G and a first subassembly SA1G in the eighth embodiment. As illustrated in FIG. 15 and FIG. 16, as elastic members, which may function as the frictionally engaging members, multiple rubber or resin elastic bars 23G extending in the axial direction X1 of a guide tube 37G of the holding member 24G are arranged in a circumferential direction K1 of the guide tube 37G. The elastic bars 23G are frictionally engaged with the inner periphery 364 (opposed portion) of the tubular portion 36 of the rack guide 18.

Accommodation grooves 39G extending in the axial direction X1 are formed in an outer periphery 373G of the guide tube 37G at equal intervals in the circumferential direction K1. The elastic bars 23G are accommodated and held in the respective accommodation grooves 39G. The elastic bars 23G held in the accommodation grooves 39G are restrained from being displaced in the axial direction X1 of the guide tube 37G. A diameter D1G of a circle tangential to the multiple elastic bars 23G is set larger than the inner diameter D2 of each of the coned disc springs 22 (D1G>D2). Thus, the elastic bars 23G restrains the coned disc springs 22 from coming off the holding member 24G.

Although not illustrated, as a modified example of the embodiment illustrated in FIG. 15 and FIG. 16, the elastic bars 23G may be accommodated and held in accommodation grooves formed in the inner periphery 364 of the tubular portion 36 of the rack guide 18, and may be frictionally engaged with the outer periphery 373G of the guide tube 37G.

Figure 17:
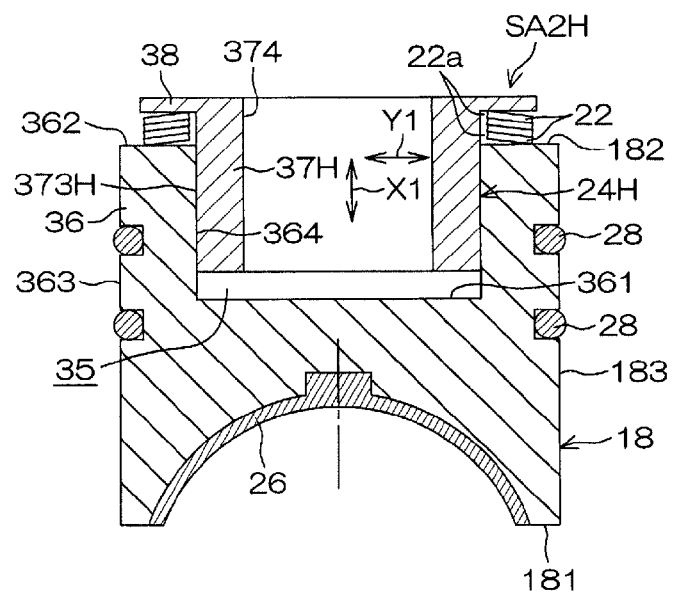
FIG. 17 is a sectional view of a second subassembly according to a ninth embodiment of the invention.

In the first to eighth embodiments as described above, the holding member is held indirectly by the rack guide via the frictionally engaging member. In contrast to this, in a ninth embodiment illustrated in FIG. 17, which is a modified example of, for example, the first embodiment illustrated in FIG. 5, a holding member 24H that is made of, for example, elastic resin, may be directly frictionally engaged with the rack guide 18 in a second subassembly SA2H. That is, an outer periphery 373H that is formed of a cylindrical face of the guide tube 37H of the holding member 24H may be fitted to and elastically compressed by (press-fitted to) the inner periphery 364 of the tubular portion 36 of the rack guide 18. With a frictionally engaging force obtained between the holding member 24H and the rack guide 18, the holding member 24H is directly held by the rack guide 18. The same components in the ninth embodiment illustrated in FIG. 17 as those in the first embodiment illustrated in FIG. 5 will be denoted by the same reference symbols as those in the first embodiment illustrated in FIG. 5. The ninth embodiment produces the same advantageous effects as those of the first embodiment illustrated in FIG. 5. Further, according to the ninth embodiment, no frictionally engaging member other than the holding member 24 is required. Thus, it is possible to simplify the configuration.

Figure 18:
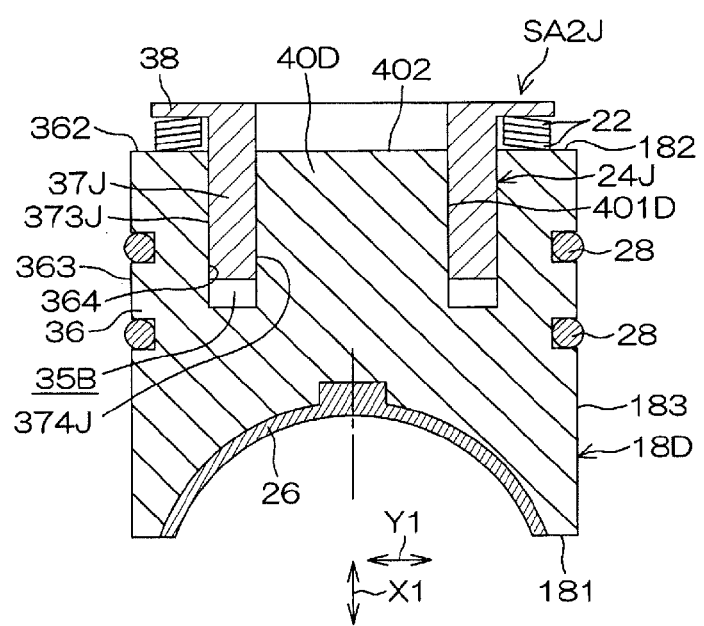
FIG. 18 is a sectional view of a second subassembly according to a tenth embodiment of the invention.

A tenth embodiment illustrated in FIG. 18 is a modified example of the fifth embodiment illustrated in FIG. 10. That is, in a second subassembly SA2J in the tenth embodiment illustrated in FIG. 18, a holding member 24J is made of, for example, elastic resin. At least one of an outer periphery 373J and an inner periphery 374J of a guide tube 37J of the holding member 24J may be frictionally engaged directly with and held by the associated one of the inner periphery 364 of the tubular portion 36 and the outer periphery 401D of the protrusion 40D. That is, at least one of the outer periphery 373J and the inner periphery 374J of the guide tune 37J of the holding member 24J is elastically compressed and fitted to (press-fitted to) the associated one of the inner periphery 364 of the tubular portion 36 and the outer periphery 401D of the protrusion 40D. With a frictionally engaging force obtained between the holding member 24J and the rack guide 18D, the holding member 24J is directly held by the rack guide 18D.

The same components in the tenth embodiment illustrated in FIG. 18 as those in the fifth embodiment illustrated in FIG. 11 will be denoted by the same reference symbols as those in the fifth embodiment illustrated in FIG. 11. The tenth embodiment produces the same advantageous effects as those of the fifth embodiment illustrated in FIG. 11. Further, according to the tenth embodiment, no frictionally engaging member other than the holding member 24J is required. Thus, it is possible to simplify the configuration. Note that, in the tenth embodiment, one of the outer periphery 373J and the inner periphery 374J of the guide tube 37J of the holding member 24J may be loosely fitted to the associated mating face, or may be opposed to the associated mating face across a clearance.

The invention is not limited to the embodiments described above. For example, not only an O-ring having a circular section but also a ring having a square or rectangular section (not illustrated) may be used as an elastic member, which may function as the frictionally engaging member. In the embodiments described above, the guide tube of the holding member serves as a radially inner guide that guides the radially inner portions 22a of the coned disc springs 22, which are the radial end portions of the coned disc springs 22. However, the guide tube of the holding member may serve as a radially outer guide that guides the radially outer portions of the coned disc springs 22, which are the radial end portions of the coned disc springs 22. Moreover, the invention may be implemented in various other embodiments within the scope of the appended claims.

What is claimed is:

1. A rack guide unit comprising:
   a rack guide accommodated in an accommodation portion formed in a housing through which a rack shaft meshed with a pinion shaft is passed, so as to be allowed to approach and move away from the rack shaft, the rack guide supporting the rack shaft such that the rack shaft is slidable in an axial direction of the rack shaft;
   a closure member secured to an external opening end of the accommodation portion, the external opening end being located on an opposite side of the accommodation portion from the rack shaft;
   at least one coned disc spring that is interposed between the closure member and the rack guide, and that urges the rack guide toward the rack shaft;

a holding member that holds the coned disc spring, and that is frictionally engaged with and held by the rack guide directly or indirectly; and a frictionally engaging member that is held by at least one of the rack guide and the holding member and that is frictionally engaged with the rack guide and the holding member, wherein the holding member includes a guide tube that guides a radial end portion of the coned disc spring, and an annular seat plate that extends radially outward from one axial end of the guide tube and that receives a load from the coned disc spring.

2. The rack guide unit according to claim 1, wherein the frictionally engaging member includes an elastic member.

3. The rack guide unit according to claim 2, wherein:
the rack guide includes an opposed portion opposed to a peripheral face of the guide tube; and
the frictionally engaging member is interposed between the peripheral face of the guide tube and the opposed portion of the rack guide.

4. The rack guide unit according to claim 3, wherein:
the frictionally engaging member is held by the peripheral face of the guide tube to constitute a subassembly including the holding member, the frictionally engaging member and the coned disc spring;
the frictionally engaging member and the coned disc spring are located on the same side of the guide tube in a radial direction of the guide tube;
the coned disc spring is disposed between the frictionally engaging member and the seat plate in an axial direction of the guide tube; and
part of the frictionally engaging member is overlapped with part of the coned disc spring as viewed from the axial direction of the guide tube in a state of the subassembly.

5. A steering system comprising the rack guide unit according to claim 2.

6. The rack guide unit according to claim 2, further comprising a compression coil spring that is interposed between the closure member and the rack guide, and that urges the rack guide toward the rack shaft.

7. The rack guide unit according to claim 1, wherein:
the rack guide includes an opposed portion opposed to a peripheral face of the guide tube; and
the frictionally engaging member is interposed between the peripheral face of the guide tube and the opposed portion of the rack guide.

8. The rack guide unit according to claim 7, wherein:
the frictionally engaging member is held by the peripheral face of the guide tube to constitute a subassembly including the holding member, the frictionally engaging member and the coned disc spring;
the frictionally engaging member and the coned disc spring are located on the same side of the guide tube in a radial direction of the guide tube;
the coned disc spring is disposed between the frictionally engaging member and the seat plate in an axial direction of the guide tube; and
part of the frictionally engaging member is overlapped with part of the coned disc spring as viewed from the axial direction of the guide tube in a state of the subassembly.

9. A steering system comprising the rack guide unit according to claim 8.

10. The rack guide unit according to claim 7, further comprising a compression coil spring that is interposed between the closure member and the rack guide, and that urges the rack guide toward the rack shaft.

11. A steering system comprising the rack guide unit according to claim 7.

12. The rack guide unit according to claim 1, further comprising a compression coil spring that is interposed between the closure member and the rack guide, and that urges the rack guide toward the rack shaft.

13. A steering system comprising the rack guide unit according to claim 1.

* * * * *